United States Patent [19]
Ori

[11] Patent Number: 6,078,434
[45] Date of Patent: Jun. 20, 2000

[54] ZOOM LENS SYSTEM

[75] Inventor: Yuichiro Ori, Moriyama, Japan

[73] Assignee: Minolta Co., Ltd., Osaka, Japan

[21] Appl. No.: 09/102,892

[22] Filed: Jun. 23, 1998

[30] Foreign Application Priority Data

Jun. 23, 1997 [JP] Japan .................................. 9-165727
Sep. 2, 1997 [JP] Japan .................................. 9-236718

[51] Int. Cl.[7] ......................................... G02B 15/14
[52] U.S. Cl. ........................... 359/691; 359/690; 359/689
[58] Field of Search .................................. 359/690, 691, 359/689, 686, 687, 688

[56] References Cited

U.S. PATENT DOCUMENTS

| | | |
|---|---|---|
| 5,619,381 | 4/1997 | Anderson . |
| 5,717,525 | 2/1998 | Estelle et al. .......................... 359/677 |
| 5,731,914 | 3/1998 | Meyers . |
| 5,745,301 | 4/1998 | Betensky ................................. 359/689 |
| 5,768,030 | 6/1998 | Estelle et al. .......................... 359/691 |
| 5,852,516 | 12/1998 | Chipper ................................... 359/676 |
| 5,872,658 | 2/1999 | Ori ......................................... 359/677 |

FOREIGN PATENT DOCUMENTS 9-197273 7/1997 Japan .
9-197274 7/1997 Japan .

*Primary Examiner*—Georgia Epps
*Assistant Examiner*—Michael A Lucas
*Attorney, Agent, or Firm*—Burns, Doane, Swecker & Mathis, LLP

[57] ABSTRACT

A zoom lens system includes a first lens unit having a negative optical power, located closer to an object side, and a second lens unit having a positive optical power, located farther from the object side. Zooming is accomplished by varying the spacing between the first and second lens units. The surface of at least one lens element in the two lens units is a diffractive optical surface. At least one surface of the lens element is an aspherical surface.

48 Claims, 12 Drawing Sheets

FIG. 1
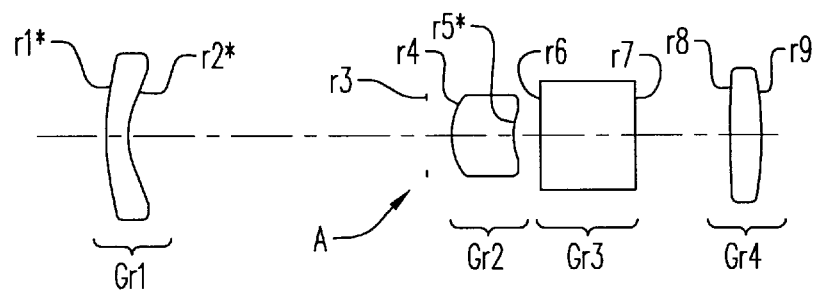
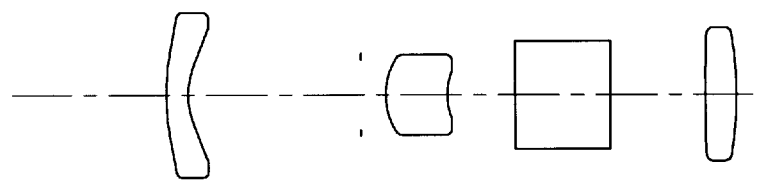
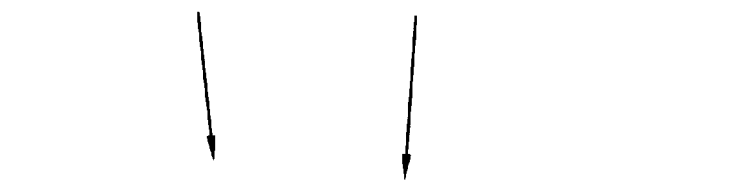

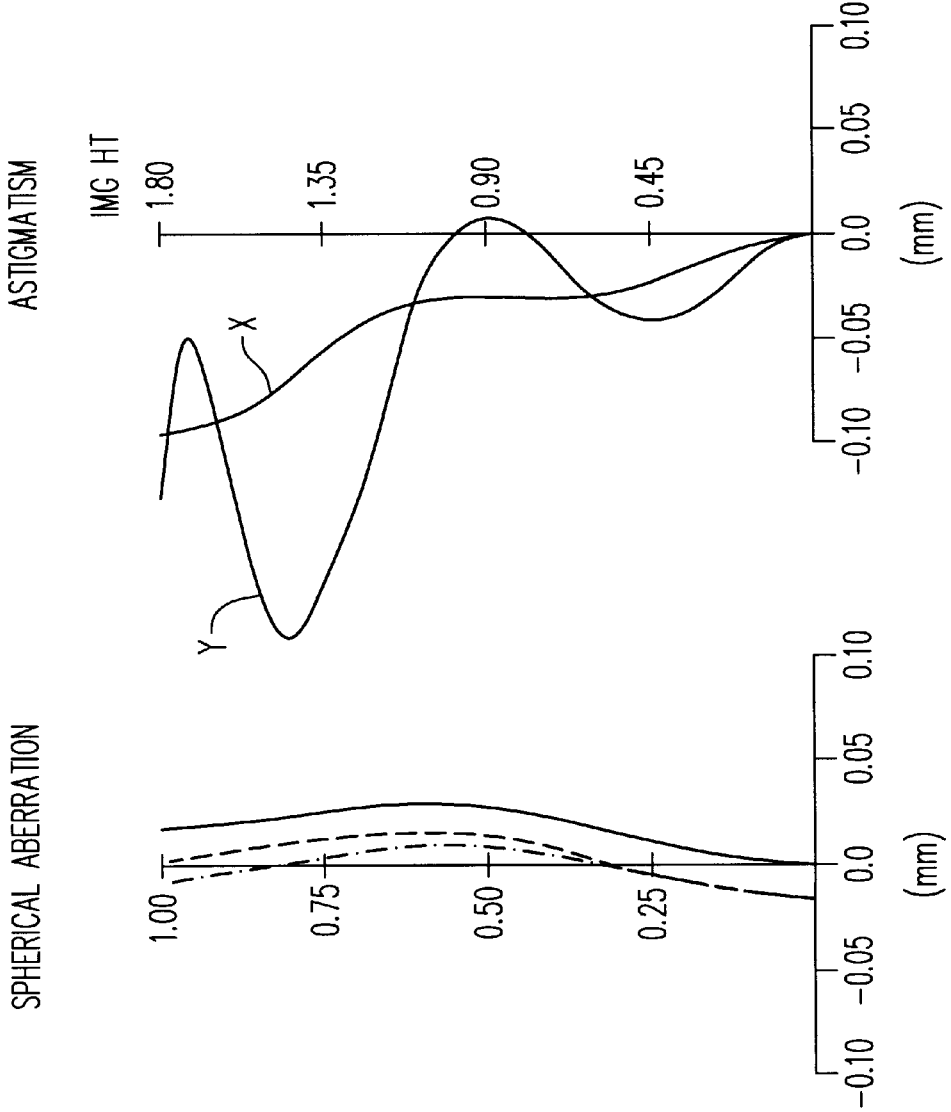

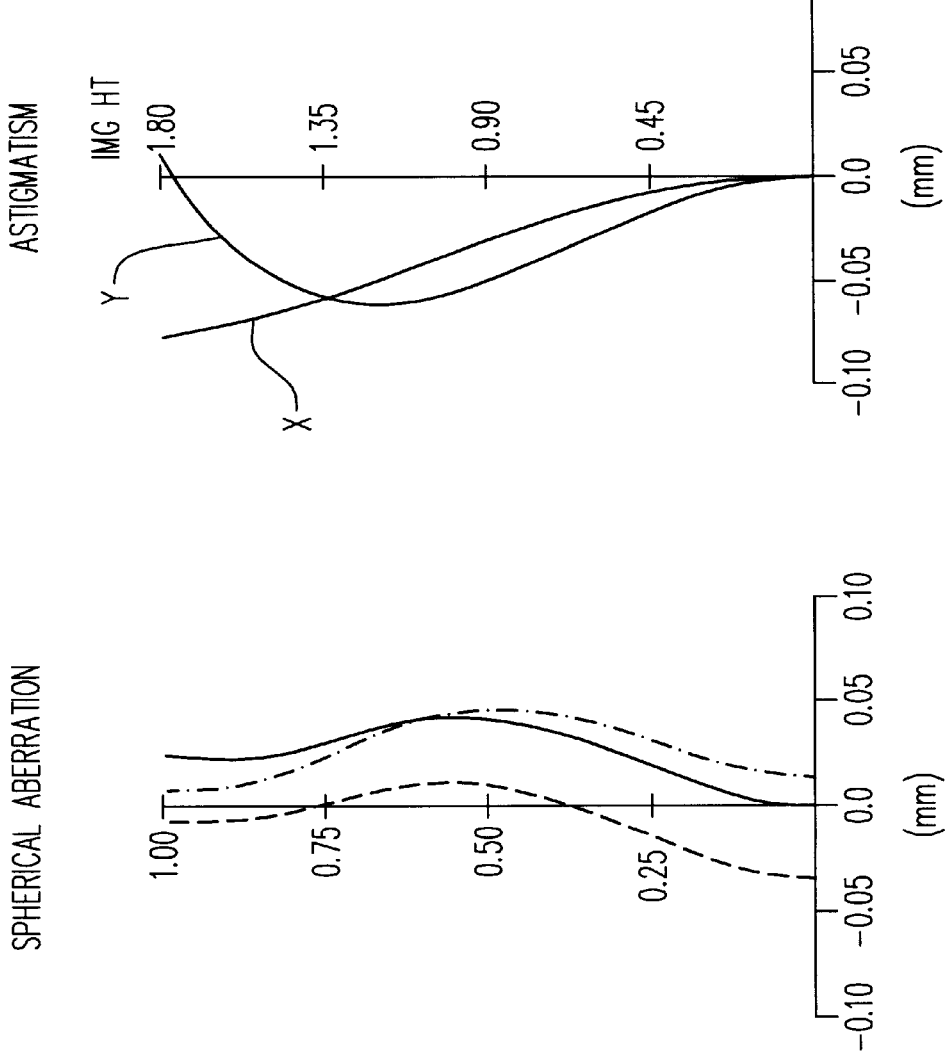

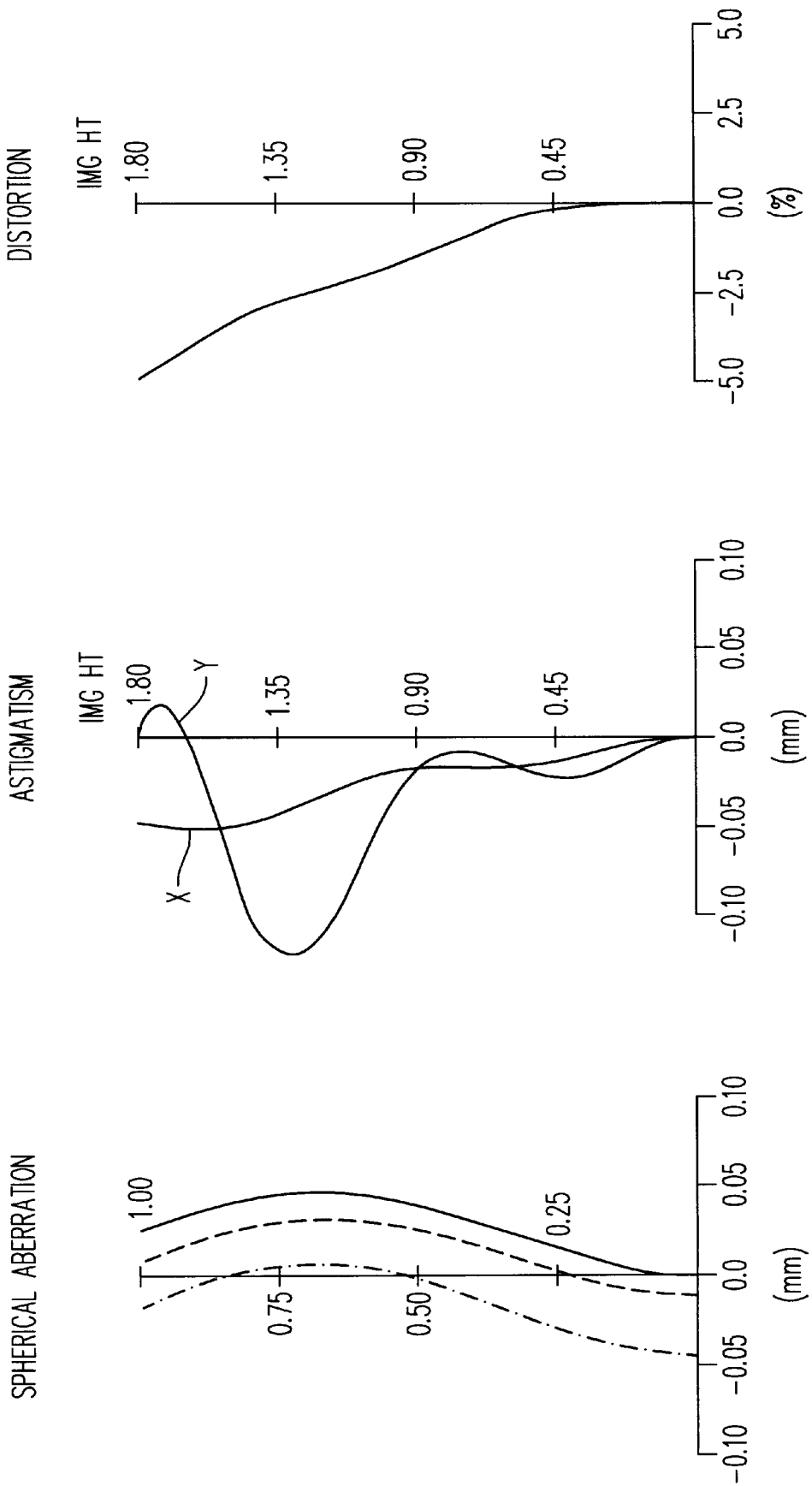

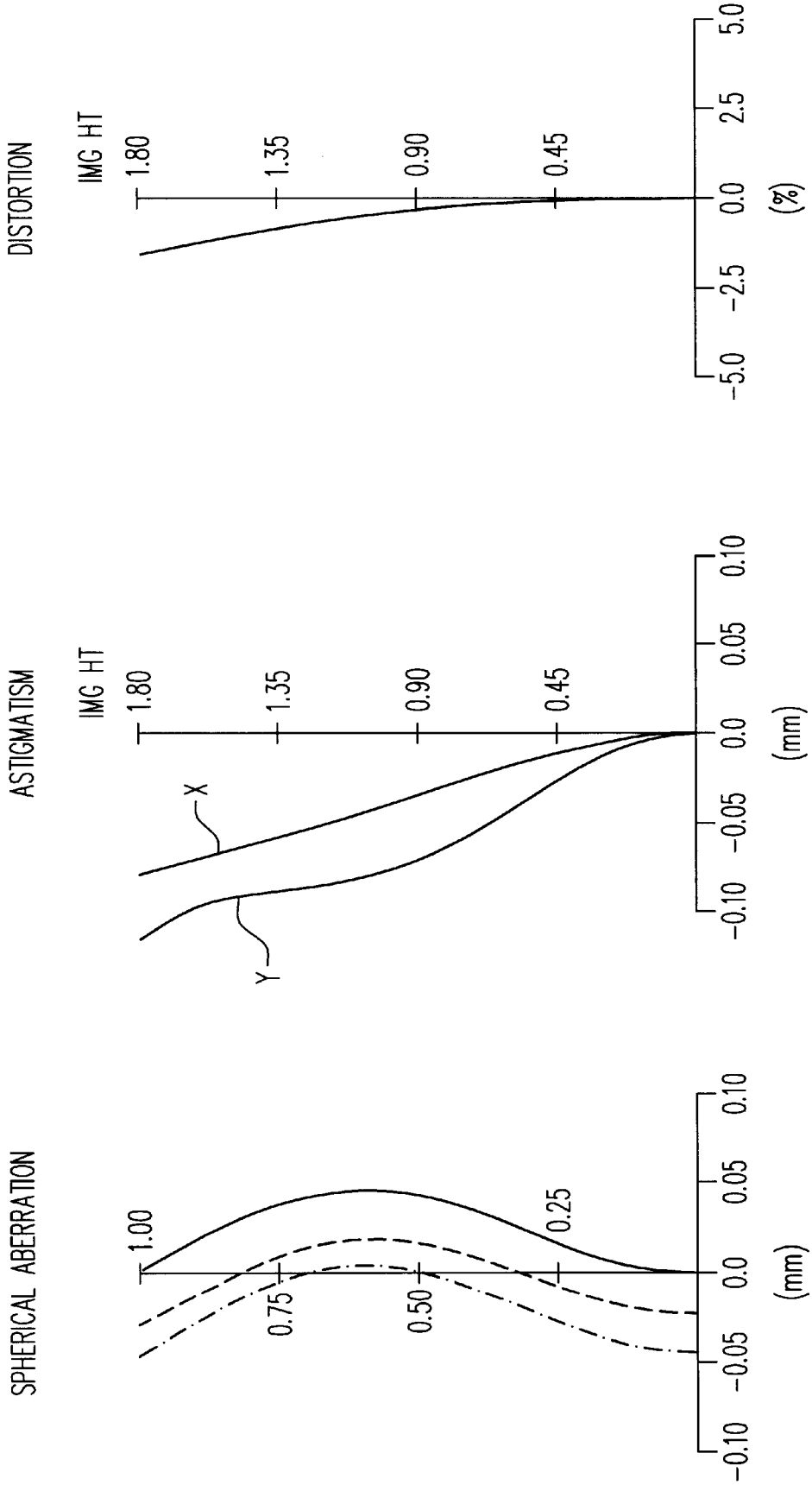

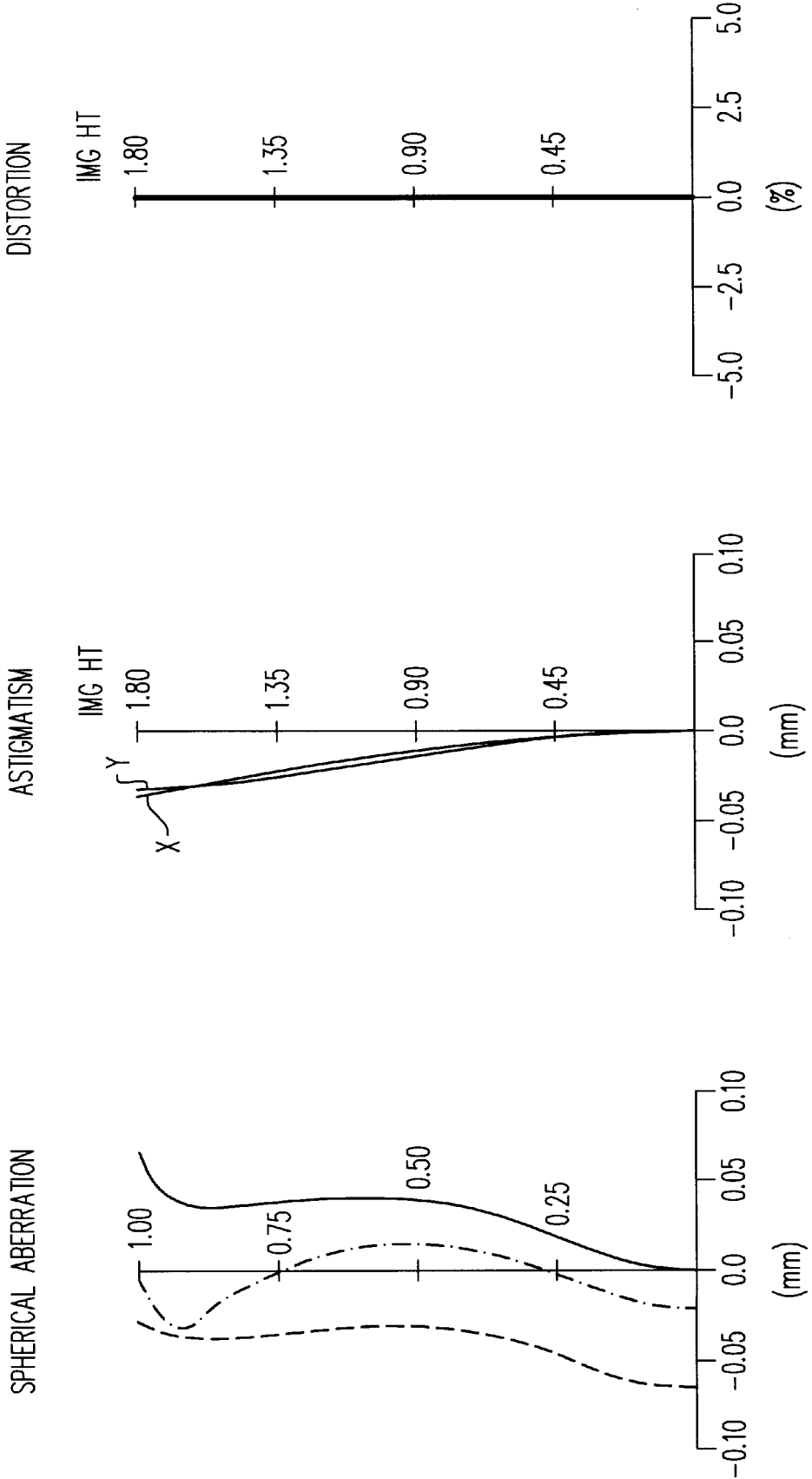

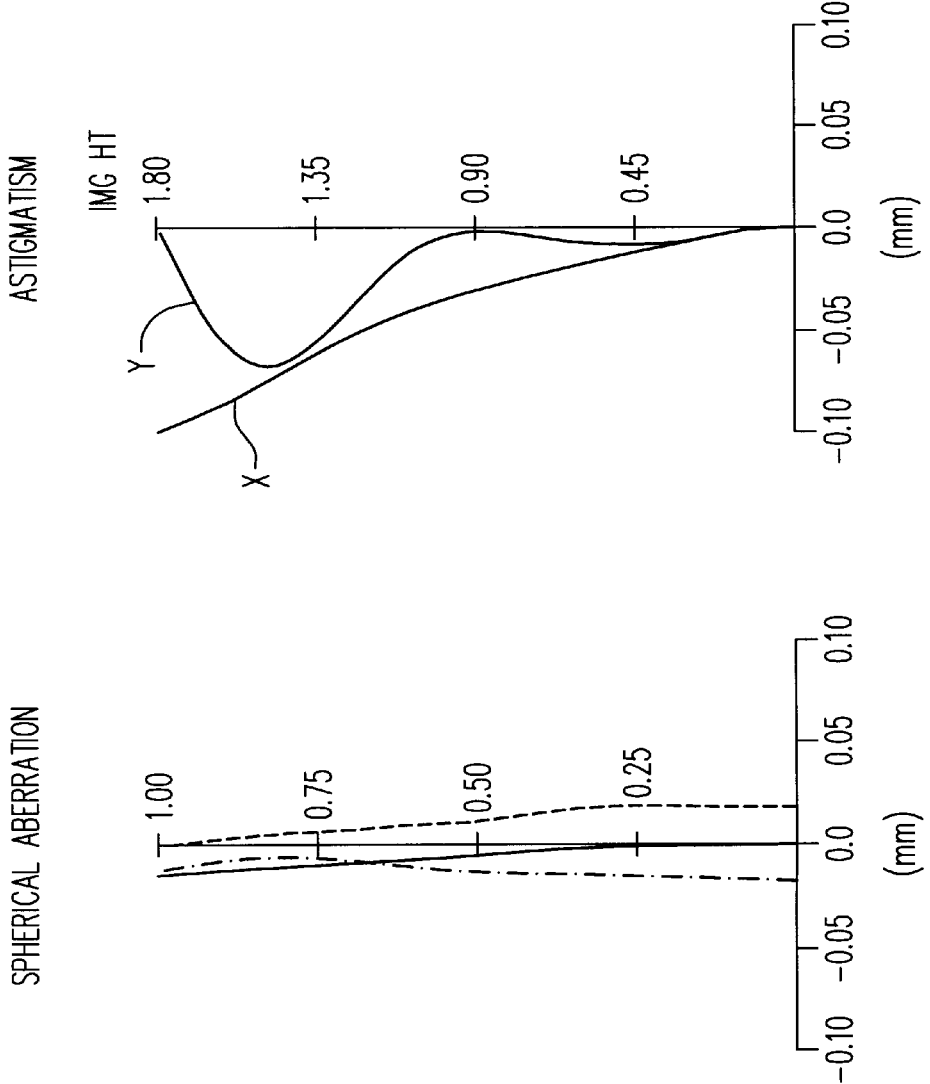

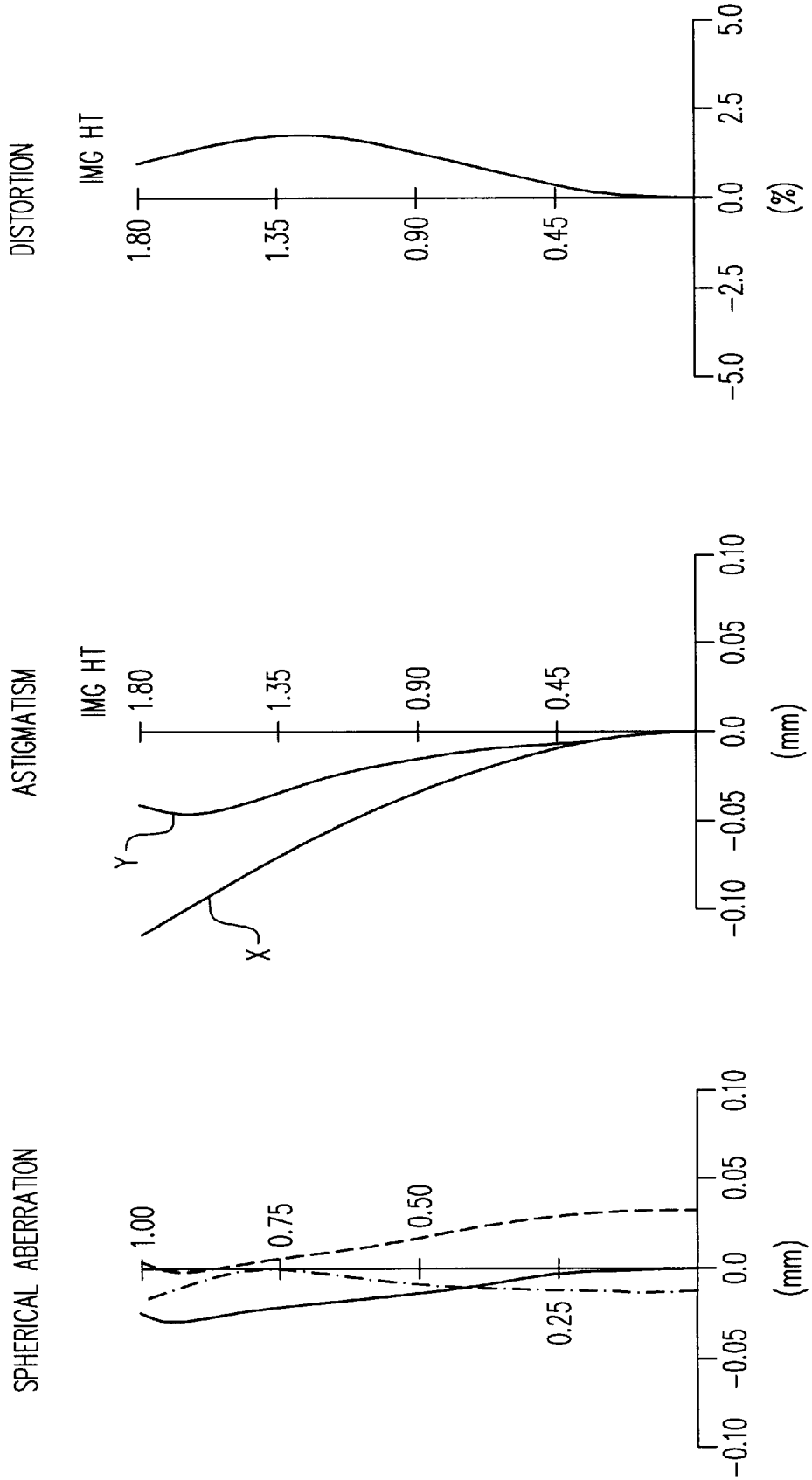

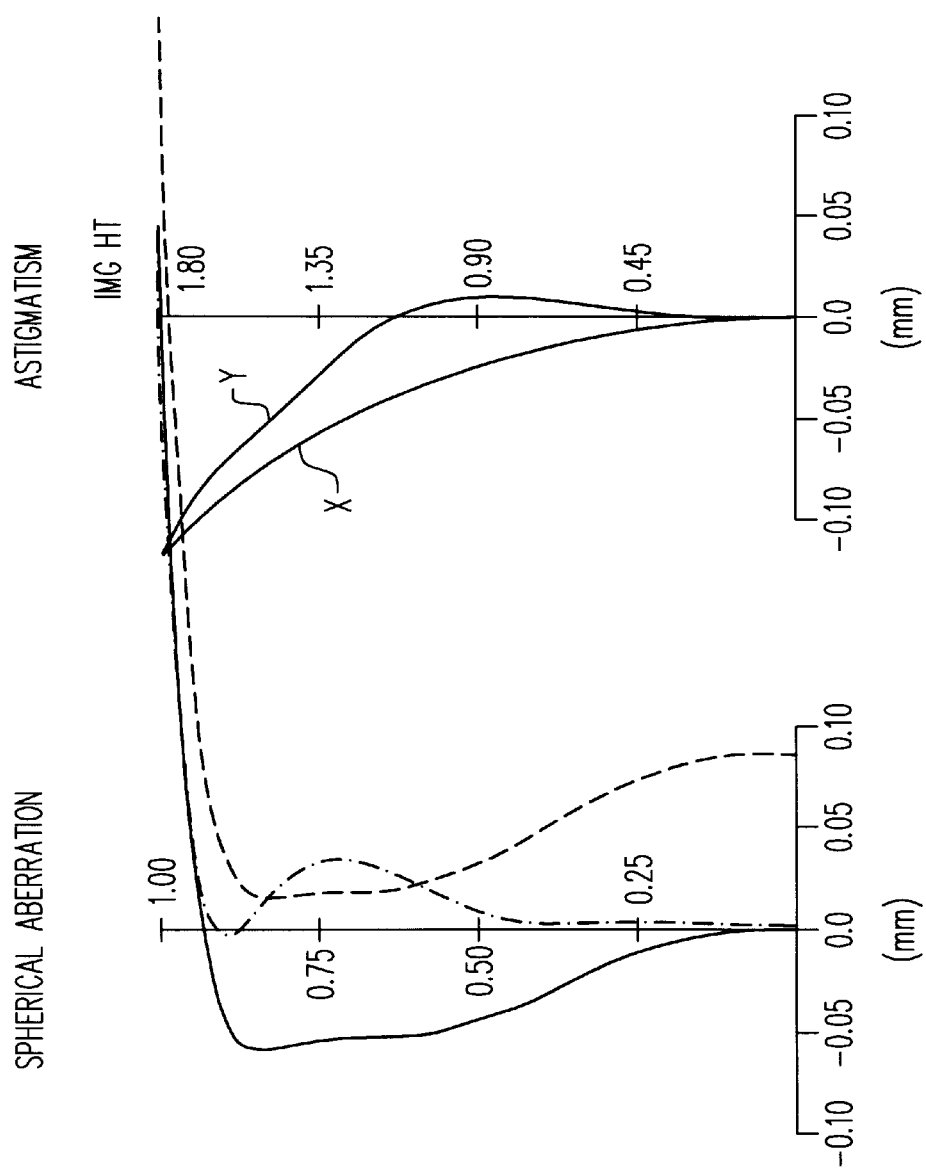

ZOOM LENS SYSTEM

This application is based on application Nos. 9-138739 and 9-138559 filed in Japan, the contents of which are hereby incorporated by reference.

BACKGROUND OF THE INVENTION

1. Field of the Invention

The present invention relates to a zoom lens system, and more specifically relates to a zoom lens system suitable for video cameras, digital cameras and the like.

2. Description of the Related Art

In recent years, demand has grown for zoom lens systems used in video cameras and digital cameras, of the type provided with solid-state sensing elements such as charge-coupled devices (CCD) and the like, which are compact and inexpensive while providing high performance. Generally, in zoom lens systems, compactness is achieved by increasing the optical power of the various lens elements while reducing the amount of movement of these lens elements. The higher degree of aberration generated by this arrangement can be suppressed to a desired value by using a lens having an aspherical surface. At least two or more lens elements are required to be effective to correct chromatic aberration, however, since an aspherical surface is unable to correct chromatic aberration.

The CCD format size, on the other hand, has tended to become more compact over the years with a corresponding demand for ever greater compactness in the size of the overall lens system. When the overall lens system is made more compact, however, there is a corresponding increase in sensitivity to manufacturing errors. Particularly in lenses comprising a plurality of lens elements, there is an increase in sensitivity to loss of performance characteristics in lenses due to spatial errors and decentering errors.

If lenses can be constructed using fewer lens elements, not only is compactness readily achieved, but cost reduction and ease of manufacture also can be realized. Therefore, although a lens required to correct chromatic aberration must be constructed using a minimum number of lens elements, there is a limitation on the optical system using only aspherical surfaces inasmuch as an aspherical surface is unable to correct chromatic aberration.

It has been proposed to reduce the number of lens elements by combined use of aspherical surfaces and lens elements of the refractive index profile type. Lenses of the refractive index profile type have the ability to correct all aberrations including chromatic aberration, and are extremely effective lenses having few lens elements. There also have been various proposals to correct chromatic aberration by combining diffractive optical elements and refractive optical elements.

For example, Japanese Laid-Open Patent Application No. 6-324262 discloses a photographic lens system using diffractive optical elements. Furthermore, Japanese Laid-Open Patent Application No. 5-164965 discloses a lens system having very few lens elements in a two-element zoom lens system of the refractive type. In two-component zoom lens systems of the positive-negative type, the moving lens element comprises a single refractive optical lens element.

When a lens of the refractive index profile type is used to correct chromatic aberration, there is negative dispersion distribution due to the extreme difficulty of manufacture. In the constructions disclosed in the aforesaid Japanese Laid-Open Patent Application Nos. 6-324262 and 5-164965, inexpensive lens elements with affixed films and the like are used in the zoom lens system, such that adequate performance cannot be assured relative to the photographic optical system using a CCD or the like as a sensing element.

OBJECTS AND SUMMARY

An object of the present invention is to provide a zoom lens system capable of being constructed with few lens elements.

Another object of the present invention is to provide a high-performance zoom lens system which is both compact and inexpensive.

These objects are attained by the zoom lens system of the present invention comprising, sequentially from the object side, a first lens unit having negative optical power, and second lens unit having positive optical power, wherein zooming is accomplished by changing the spacing between the first and second lens units, and wherein at least one surface in at least one lens unit among the aforesaid two lens units is a diffractive type optical surface represented by the phase function below.

$$\Phi(H) = 2\pi(\Sigma R_i H^i)\lambda_o$$

Where $\Phi$ represents the phase function, H represents the height in a direction perpendicular to the optical axis, $R_i$ represents a first degree phase coefficient, and $\lambda_o$ represents the design wavelength.

The diffractive optical element having the aforesaid diffractive optical surface is constructed so as to satisfy the following condition.

$$0.02 < |\phi d\phi| < 0.2$$

Where $\phi d = -2mR2$, and R2 represents a second degree phase coefficient, m represents the diffraction degree, and $\phi = \phi r + \phi d$, where $\phi$ represents the optical power of the lens, $\phi r$ represents the combined optical power of all of the refractive components of the zoom optical system including the diffractive optical element, and $\phi d$ represents the optical power of the diffractive optical element.

At least one surface of the refractive optical lens element provided with the diffractive optical surface is constructed as an aspherical surface.

These and other objects, advantages and features of the present invention will become apparent from the following description thereof taken in conjunction with the accompanying drawings which illustrate specific embodiments of the invention. with the accompanying drawings which illustrate specific embodiments of the invention.

BRIEF DESCRIPTION OF THE DRAWINGS

FIG. 1 illustrates the optical construction and optical path of a first embodiment (example 1);

FIGS. 4a–4c are aberration diagrams at the wide angle end of the first embodiment;

FIGS. 6a–6c are aberration diagrams at the telephoto end of the first embodiment;

FIGS. 7a–7c are aberration diagrams at the wide angle end of the second embodiment;

FIGS. 8a–8c are aberration diagrams at the intermediate focal length of the second embodiment;

FIGS. 9a–9c are aberration diagrams at the telephoto end of the second embodiment;

FIGS. 10a–10c are aberration diagrams at the wide angle end of the third embodiment;

FIGS. 11a–11c are aberration diagrams at the intermediate focal length of the third embodiment;

FIGS. 12a–12c are aberration diagrams at the telephoto end of the third embodiment;

In the following description, like parts are designated by like reference numbers throughout the several drawings.

DETAILED DESCRIPTION OF PREFERRED EMBODIMENTS

Figure 2:
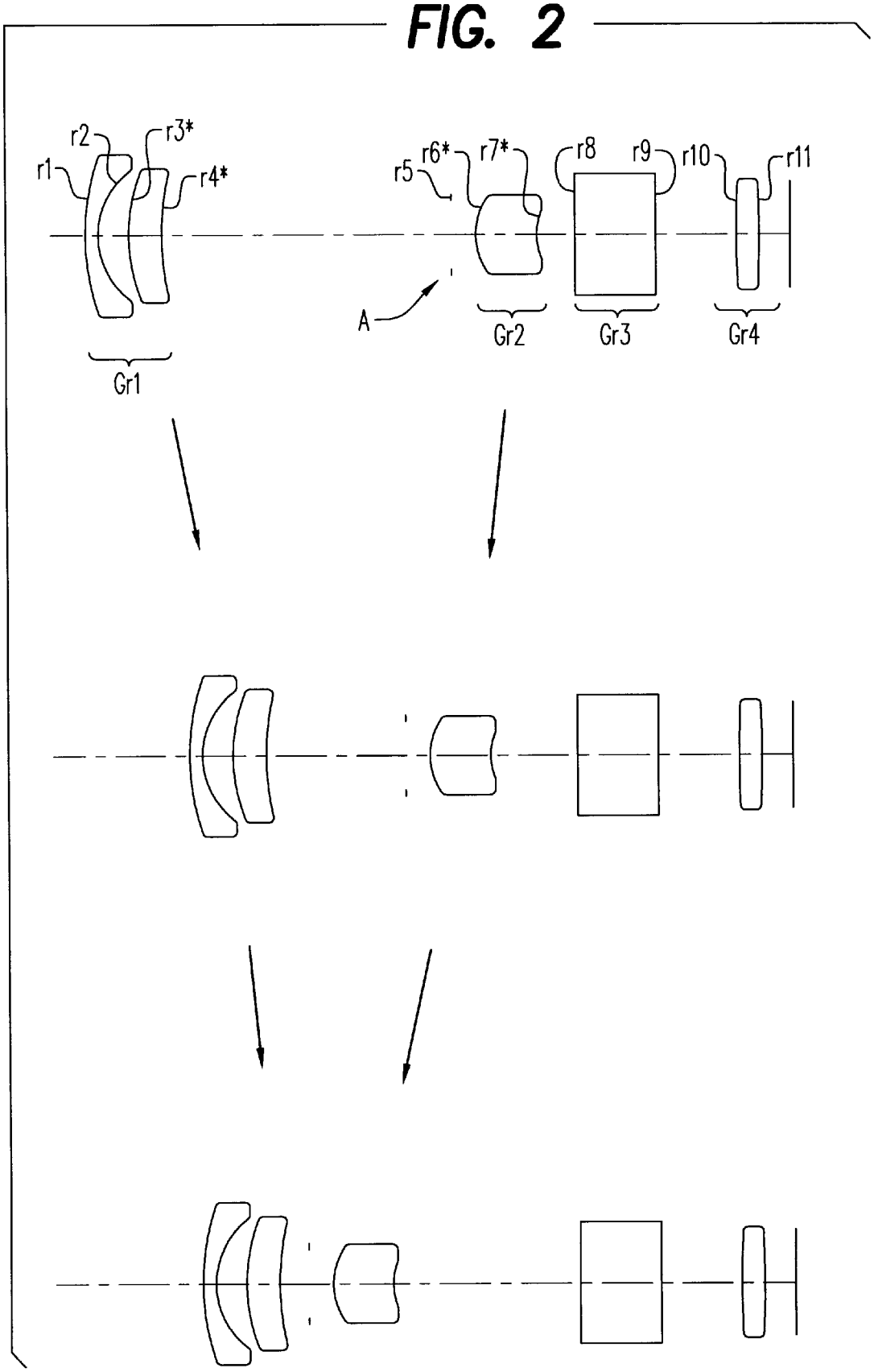
FIG. 2 illustrates the optical construction and optical path of a second embodiment (example 2)
Figure 3:
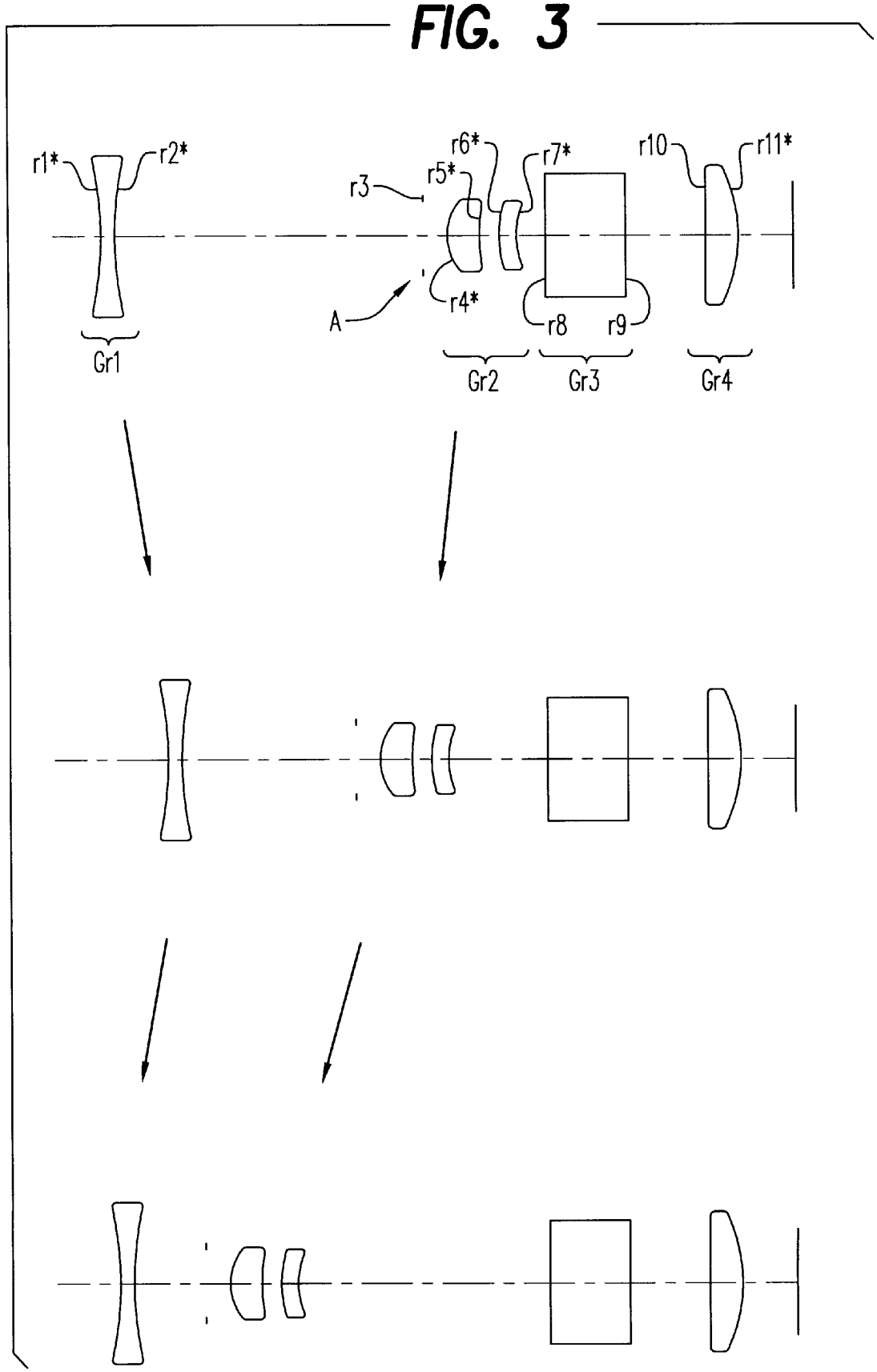
FIG. 3 illustrates the optical construction and optical path of a third embodiment (example 3)

Preferred embodiments of the present invention are described hereinafter with reference to the accompanying drawings. FIGS. 1–3 show the construction of the lens elements of the lens systems of the first through third embodiments. As shown in these drawings, the lens systems of the first through third embodiments comprise, sequentially from the object side (left side in the drawings), a first lens unit Gr1, diaphragm A, second lens unit Gr2, third lens unit Gr3, and fourth lens unit Gr4. In the context of the present invention, the term "lens unit" encompasses a single lens element as well as a group of two or more lens elements.

In the drawings, the top stage shows the wide angle end of the zooming range, the middle stage shows the intermediate focal length, and the bottom stage shows the telephoto end. During variable magnification from the wide angle end to the telephoto end, zooming is effectively accomplished by the mode of movement of the various lens elements as indicated by the arrows, and the amount of movement of the lens elements as well as the overall length during zooming is reduced relative to a conventional zoom lens system.

The first lens unit Gr1 of the first embodiment comprises a single negative lens element provided with a diffractive optical surface on the image side and having a strongly concave surface facing the image side; the second lens unit Gr2 comprises a single positive lens element provided with a diffractive optical surface on the image side and having a strongly concave surface facing the object side; the third lens unit Gr3 comprises a low-cut filter; and the fourth lens unit Gr4 comprises a concave lens element functioning as a telecentric optical system.

The first lens unit Gr1 in the second embodiment comprises sequentially, from the object side, a negative meniscus lens element provided with a convex surface on the object side, and a positive meniscus lens element provided with a convex surface on the object side; the second lens unit Gr2 comprises a single positive lens element provided with a diffractive optical surface on the image side; the third lens unit Gr3 comprises a low-cut filter; and the fourth lens unit Gr4 comprises a convex lens element functioning as a telecentric optical system.

The first lens unit Gr1 of the third embodiment comprises, sequentially from the object side, a single concave lens element provided with a diffractive optical surface on the image side; the second lens unit Gr2 comprises, sequentially from the object side, a positive meniscus lens element provided with a diffractive optical surface on the image side and having a strongly convex surface facing the object side, and a negative meniscus lens element provided with a concave surface facing the image side; the third lens unit Gr3 comprises a low-cut filter; and the fourth lens unit Gr4 comprises a convex lens element functioning as a telecentric optical system.

The aforesaid embodiments are characterized by providing a diffractive optical surface represented by the phase function below as a refractive/diffractive lens element formed on a refractive lens surface.

$$\Phi(H) = 2\pi(\Sigma R_i H^i)/\lambda_o \quad (1)$$

Where $\Phi$ represents the phase function, H represents the height in a direction perpendicular to the optical axis, $R_i$ represents a first degree phase coefficient, and $\lambda_o$ represents the design wavelength.

The characteristics of the diffractive optical element are described below.

The diffractive optical element can provide an optical effectiveness equivalent to an aspherical surface in a refractive optical surface by suitably designing the phase function. When attempting to obtain the effectiveness of an aspherical surface in a refractive optical surface simply by the phase shape of the diffractive optical surface, however, the direction of light bent by diffraction is different at wavelengths other than the design wavelength of the diffractive optical surface, such that color spherical aberration and coma become disadvantageously large.

Therefore, when a diffractive optical surface is formed in a refractive optical surface to minimize the number of lens elements, it is desirable to introduce an aspherical surface to one or another lens element surface to balance axial aberration and variable magnification chromatic aberration by the diffractive optical surface and correct spherical aberration and coma via said aspherical surface of the refractive optical surface. It is further desirable when constructing a lens element of a single lens element, both that diffractive optical surface and the opposite surface are bilaterally formed as aspherical surfaces to increase the freedom relative to aberration correction.

Diffraction efficiency can be improved by providing the diffractive optical surface of the diffractive optical element in a blazed configuration (sawtooth shaped). Methods of blazing include manufacturing the lens element in approximate sawtooth shaped steps (binary optics) using semiconductor manufacturing technology. Alternatively, a mold may be manufactured by precision machining, or manufactured by molding glass and plastic material to form a resin layer on glass.

In theory, for a given wavelength there exists a field angle for a blazed diffractive optical element which yields a diffraction efficiency of 100%. Similarly, for every field angle there exists a corresponding wavelength which produces a diffraction efficiency of 100%. When the designed phase function is converted to a shape function in the diffractive optical elements of the present embodiment, the change in diffraction efficiency due to the field angle produces negligible effect to about ±20° because the blaze height is about 1 $\mu$m. A reduction in diffraction efficiency, produced by wavelength, influences image forming performance as high order diffracted light. This effect can be minimized, however, by suppressing the usable wavelength band and optimizing the design wavelength.

When a diffractive optical surface is provided on a refractive optical lens element, the method of manufacturing said surface may include, for example, methods of molding a lens having a diffractive optical surface using a mold, compound molding methods to mold resin on the surface of a refractive optical lens element to form a diffraction grating on said lens element, and methods which form a diffractive surface by anisotropic etching and the like.

Although the material of the refractive optical lens element provided with a diffractive optical surface is glass in the present embodiment, this glass may be substituted with plastic. In this instance, chromatic aberration caused by dispersion in the plastic may be corrected by providing greater optical power to the diffractive optical element. Molding the plastic lens element is greatly effective in reducing costs due to its superior mass production characteristics.

When attempting to correct chromatic aberration only by a refractive optical element, the only possible method is to combine an optical element having positive optical power and an optical element having negative optical power since the dispersion value is normally positive. Since the optical powers of each lens element mutually cancel one another, the optical power of one optical element must be increased relative to the overall combined optical power to obtain a desired combined power, which readily generates high order aberration.

On the other hand, when chromatic aberration is corrected by combining a refractive optical element and a diffractive optical element, the diffractive optical element has an extremely large negative dispersion value, such that the optical power designation of the refractive optical element and diffractive optical element may be equal. Accordingly, it is possible to correct chromatic aberration by forming a diffractive optical surface on a single refractive optical element. This arrangement provides that the optical power of the refractive optical element may be smaller than the combined optical power, and is extremely advantageous in correcting aberration. Where $\phi r$ represents the optical power of the refractive optical element, and $\phi d$ represents the optical power of the diffractive optical element (when the combined optical power is $\phi=\phi r+\phi d$), vr represents the dispersion value of the refractive optical element, vd represents the dispersion value of the diffractive optical element, $N_{0d}$ represent the refractive index relative to the d-line, $N_{OG}$ represents the refractive index relative to the G-line, $N_{OC}$ represents the refractive index relative to the C-line, $\lambda_d$ represents the d-line wavelength, $\lambda_G$ represents the G-line wavelength, and $\lambda_C$ represents the C-line wavelength. The diffractive optical element can therefore be understood to have a large negative dispersion of −2.67. Using this large negative dispersion effectively to correct color aberration makes it possible to construct a high performance zoom lens system using few lens elements.

When using a diffractive optical element, it is desirable that said diffractive optical element satisfy the following condition:

$$0.02<|\Phi d/\Phi|<0.2 \quad (2)$$

Where $\phi d=-2mR2$; R2 represents the second degree phase coefficient, and m represents the diffraction degree; and $\phi=\phi r+\phi d$, $\phi$ represents the optical power of the lens element, $\phi r$ represents the combined optical power of the refractive optical system of the lens elements including the diffractive optical element, and $\phi d$ represents the optical power of the diffractive optical element.

This conditional equation stipulates the optical power of the diffractive optical element. When the upper limit of conditional equation (2) is exceeded, there is excessive chromatic aberration correction by the diffractive optical elements due to the excessively strong optical power of the diffractive optical element within the lens elements. Conversely, when the lower limit of conditional equation (2) is exceeded, there is inadequate chromatic aberration correction due to the excessively weak optical power of the diffraction optical element within the lens elements.

It is further desirable that zoom lens systems comprising a first lens element having negative optical power, and second lens element having positive lens power, lens elements. Conversely, when the lower limit of conditional equation (2) is exceeded, there is inadequate chromatic aberration correction due to the excessively weak optical power of the diffraction optical element within the lens elements.

It is further desirable that zoom lens systems comprising a first lens element having negative optical power, and second lens element having positive lens power, and which accomplish variable magnification by changing the spacing between said first lens element and said second lens element satisfy the following condition:

$$0.5<|\phi 1|/\phi 2<0.9 \quad (3)$$

Where $\phi 1$ represents the optical power of the first lens element, and $\phi 2$ represents the optical power of the second lens element.

In the aforesaid conditional equation, the optical power of the second lens element increases when the lower limit is exceeded, thereby increasing the generation of high order aberration. It is also difficult to obtain adequate back focus for the low-cut filter and the like. When the upper limit is exceeded, the optical power of the first lens element is increased so as to make it difficult to correct high order aberration, particularly off-axis aberration.

The construction of the zoom lens system of the present invention is described below by way of specific examples using construction data and aberration diagrams. The numerical examples 1–3 correspond to the first through third embodiments, respectively, and the construction diagrams of the first through third embodiments (FIGS. 1–3) respectively show the construction of lens elements of the corresponding numerical examples 1–3.

In the examples, ri (i=1, 2, 3 ... ) represents the radius of curvature of the $i^{th}$ surface counting from the object side, di (i=1, 2, 3 ... ) represents the axial distance of the $i^{th}$ surface counting from the object side, Ni (i=1, 2, 3 ... ) represents the refractive index and vi (i=1, 2, 3 ... ) represents the Abbe No. relative to the d-line of the $i^{th}$ surface counting from the object side. In the examples, surfaces having an asterisk (*) attached to the radius of curvature are constructed as aspherical surfaces, and the equation expressing the shape of said aspherical surfaces is defined below.

$$x(H)=C \cdot H^2/\{1+(1-\epsilon C^2 \cdot H^2)^{1/2}\}+\Sigma AiH^i$$

Where H represents the height in a direction perpendicular to the optical axis, x(H) represents the amount of displacement (surface apex standard) in the optical axis direction at the position of height H, C represents the paraxial curvature, $\epsilon$ represents the second degree curvature parameter, and Ai represents the aspherical surface coefficient of degree i.

TABLE 1

| f | 3.600 mm | −5.358 mm | −7.200 mm |
|---|---|---|---|
| 2ω | 53.1° | −37.1° | −28.1° |
| FNO | 4.10 | −4.75 | −5.75 |

| Radius of Curvature | Axial Distance | Refractive Index | Abbe Number |
|---|---|---|---|
| r1* = 4.656 | | | |
| | d1 = 0.578 | N1 = 1.75450 | v1 = 51.57 |
| r2* = 2.483 | | | |
| | d2 = 7.803-4.504-2.775 | | |

TABLE 1-continued

| | | | |
|---|---|---|---|
| r3 = ∞ | | | |
| | d3 = 0.670 | | |
| r4 = 1.710 | | | |
| | d4 = 1.674 | N2 = 1.49310 | ν2 = 83.58 |
| r5* = 3.569 | | | |
| | d5 = 0.670~1.830~3.048 | | |
| r6 = ∞ | | | |
| | d6 = 2.500 | N3 = 1.54426 | ν3 = 69.60 |
| r7 = ∞ | | | |
| | d7 = 2.500 | | |
| r8 = ∞ | | | |
| | d8 = 0.700 | N4 = 1.75450 | ν4 = 51.57 |
| r9 = −18.706 | | | |

Aspherical Data of 1st (r1) Surface $\epsilon = 1.0000$
$A4 = 1.6576181 \times 10^{-2}$
$A6 = 6.0052317 \times 10^{-4}$
$A8 = 6.7063588 \times 10^{-4}$
$A10 = -1.6933671 \times 10^{-4}$
$A12 = 1.3132425 \times 10^{-5}$ Aspherical Data of 2nd (r2) Surface $\epsilon = 1.0000$
$A4 = 3.1018270 \times 10^{-2}$
$A6 = 4.7612945 \times 10^{-3}$
$A8 = 9.2688884 \times 10^{-4}$
$A10 = 6.1490051 \times 10^{-5}$ Aspherical Data of 5th (r5) Surface $\epsilon = 1.0000$
$A4 = 6.3412012 \times 10^{-2}$
$A6 = -3.7254376 \times 10^{-3}$
$A8 = 4.2815678 \times 10^{-2}$
$A10 = -6.7454230 \times 10^{-3}$ Phase Data of 2nd (r2) Surface $R2 = 3.5661105 \times 10^{-3}$
$R4 = 5.5835819 \times 10^{-4}$
$R6 = 6.1662211 \times 10^{-5}$
$R8 = 1.2269394 \times 10^{-6}$ Phase Data of 5th (r5) Surface $R2 = -7.1391486 \times 10^{-3}$
$R4 = -3.3402769 \times 10^{-4}$
$R6 = -4.5032755 \times 10^{-4}$
$R8 = -1.3562131 \times 10^{-3}$

TABLE 2

| f | 3.697 mm | −5.821 mm | −10.469 mm |
|---|---|---|---|
| 2ω | 51.9° | −34.4° | −19.5° |
| FNO | 4.10 | −4.75 | −5.75 |

| Radius of Curvature | Axial Distance | Refractive Index | Abbe Number |
|---|---|---|---|
| r1 = 8.975 | | | |
| | d1 = 0.400 | N1 = 1.62280 | ν1 = 56.88 |
| r2 = 2.724 | | | |
| | d2 = 0.970 | | |
| r3* = 5.378 | | | |
| | d3 = 1.020 | N2 = 1.84666 | ν2 = 23.82 |
| r4* = 6.573 | | | |
| | d4 = 8.994~4.370~0.800 | | |
| r5 = ∞ | | | |
| | d5 = 0.800 | | |
| r6* = 2.168 | | | |
| | d6 = 1.971 | N3 = 1.49310 | ν3 = 83.58 |
| r7* = 5.673 | | | |
| | d7 = 1.145~2.665~6.014 | | |
| r8 = ∞ | | | |
| | d8 = 2.500 | N4 = 1.54426 | ν4 = 69.60 |
| r9 = ∞ | | | |
| | d9 = 2.500 | | |

TABLE 2-continued

| | | | |
|---|---|---|---|
| r10 = ∞ | | | |
| | d10 = 0.700 | N5 = 1.75450 | ν5 = 51.57 |
| r11 = −47.156 | | | |

Aspherical Data of 3rd (r3) Surface $\epsilon = 1.0000$
$A4 = -2.3489225 \times 10^{-3}$
$A6 = -5.4585922 \times 10^{-4}$
$A8 = 4.4578691 \times 10^{-4}$
$A10 = -1.2284411 \times 10^{-4}$
$A12 = 1.0607672 \times 10^{-5}$ Aspherical Data of 4th (r4) Surface $\epsilon = 1.0000$
$A4 = -6.7193923 \times 10^{-3}$
$A6 = 1.0662739 \times 10^{-3}$
$A8 = -4.1692519 \times 10^{-4}$
$A10 = 4.7443644 \times 10^{-5}$
$A12 = -1.5612785 \times 10^{-6}$ Aspherical Data of 6th (r6) Surface $\epsilon = 1.0000$
$A4 = -2.0378356 \times 10^{-4}$
$A6 = 1.5174875 \times 10^{-3}$
$A8 = -7.6281069 \times 10^{-4}$
$A10 = 4.5957841 \times 10^{-4}$
$A12 = -1.1133638 \times 10^{-2}$ Aspherical Data of 7th (r7) Surface $\epsilon = 1.0000$
$A4 = 3.0832900 \times 10^{-2}$
$A6 = 2.7429100 \times 10^{-3}$
$A8 = 4.4052200 \times 10^{-3}$
$A10 = 4.6371700 \times 10^{-4}$ Phase Data of 7th (r7) Surface $R2 = -4.7168032 \times 10^{-3}$
$R4 = -8.9206717 \times 10^{-4}$

TABLE 3

| f | 3.690 mm | −5.820 mm | −10.500 mm |
|---|---|---|---|
| 2ω | 52.0° | −34.4° | −19.5° |
| FNO | 4.10 | −4.75 | −5.75 |

| Radius of Curvature | Axial Distance | Refractive Index | Abbe Number |
|---|---|---|---|
| r1* = 10.265 | | | |
| | d1 = 0.500 | N1 = 1.62280 | ν1 = 56.88 |
| r2* = 16.311 | | | |
| | d2 = 9.533~5.339~2.101 | | |
| r3 = ∞ | | | |
| | d3 = 0.800 | | |
| r4* = 2.104 | | | |
| | d4 = 0.971 | N2 = 1.49310 | ν2 = 83.58 |
| r5* = 13.923 | | | |
| | d5 = 0.609 | | |
| r6* = 4.746 | | | |
| | d6 = 0.500 | N3 = 1.83350 | ν3 = 21.00 |
| r7* = 2.919 | | | |
| | d7 = 0.900~3.119~1.719 | | |
| r8 = ∞ | | | |
| | d8 = 2.500 | N4 = 1.54426 | ν4 = 69.60 |
| r9 = ∞ | | | |
| | d9 = 2.500 | | |
| r10 = ∞ | | | |
| | d10 = 1.000 | N5 = 1.75450 | ν5 = 51.57 |
| r11* = −4.342 | | | |
| | d11 = 1.721 | | |

Aspherical Data of 1st (r1) Surface $\epsilon = 1.0000$
$A4 = -8.9729161 \times 10^{-4}$ TABLE 3-continued

A6 = 1.1694318 × 10⁻³
A8 = −2.0295844 × 10⁻⁴
A10 = 1.0926010 × 10⁻⁵

Aspherical Data of 2nd (r2) Surface $\epsilon$ = 1.0000
A4 = −1.3032908 × 10⁻³
A6 = 1.5863549 × 10⁻³
A8 = −3.2402251 × 10⁻⁴
A10 = 2.0604660 × 10⁻⁵

Aspherical Data of 4th (r4) Surface $\epsilon$ = 1.0000
A4 = 4.8194887 × 10⁻³
A6 = −2.0974228 × 10⁻⁴
A8 = −4.2256435 × 10⁻⁴
A10 = 4.7075161 × 10⁻³
A12 = −1.1955547 × 10⁻³

Aspherical Data of 5th (r5) Surface $\epsilon$ = 1.0000
A4 = 1.2288889 × 10⁻²
A6 = −7.6027425 × 10⁻³
A8 = 1.4017336 × 10⁻²
A10 = 6.3275903 × 10⁻³
A12 = −1.9337441 × 10⁻³

Aspherical Data of 6th (r6) Surface $\epsilon$ = 1.0000
A4 = −1.7294753 × 10⁻²
A6 = −3.1952167 × 10⁻³
A8 = 1.2645003 × 10⁻²
A10 = 9.0620900 × 10⁻³
A12 = −6.9750102 × 10⁻³

Aspherical Data of 7th (r7) Surface $\epsilon$ = 1.0000
A4 = −9.9558593 × 10⁻³
A6 = 6.7862898 × 10⁻³
A8 = 8.9148879 × 10⁻³
A10 = 7.8408570 × 10⁻³
A12 = −5.9013404 × 10⁻³

Aspherical Data of 11th (r11) Surface $\epsilon$ = 1.0000
A4 = 8.2117902 × 10⁻³
A6 = −6.3200999 × 10⁻⁴
A8 = −4.1790050 × 10⁻⁵
A10 = 1.8541330 × 10⁻⁵
A12 = −1.3698720 × 10⁻⁶

Phase Data of 2nd (r2) Surface

R2 = 5.1208737 × 10⁻³
R4 = −2.7863689 × 10⁻⁴
R6 = 7.3889849 × 10⁻⁵
R8 = −7.4336868 × 10⁻⁶

Figures 5A, 5B, 5C:
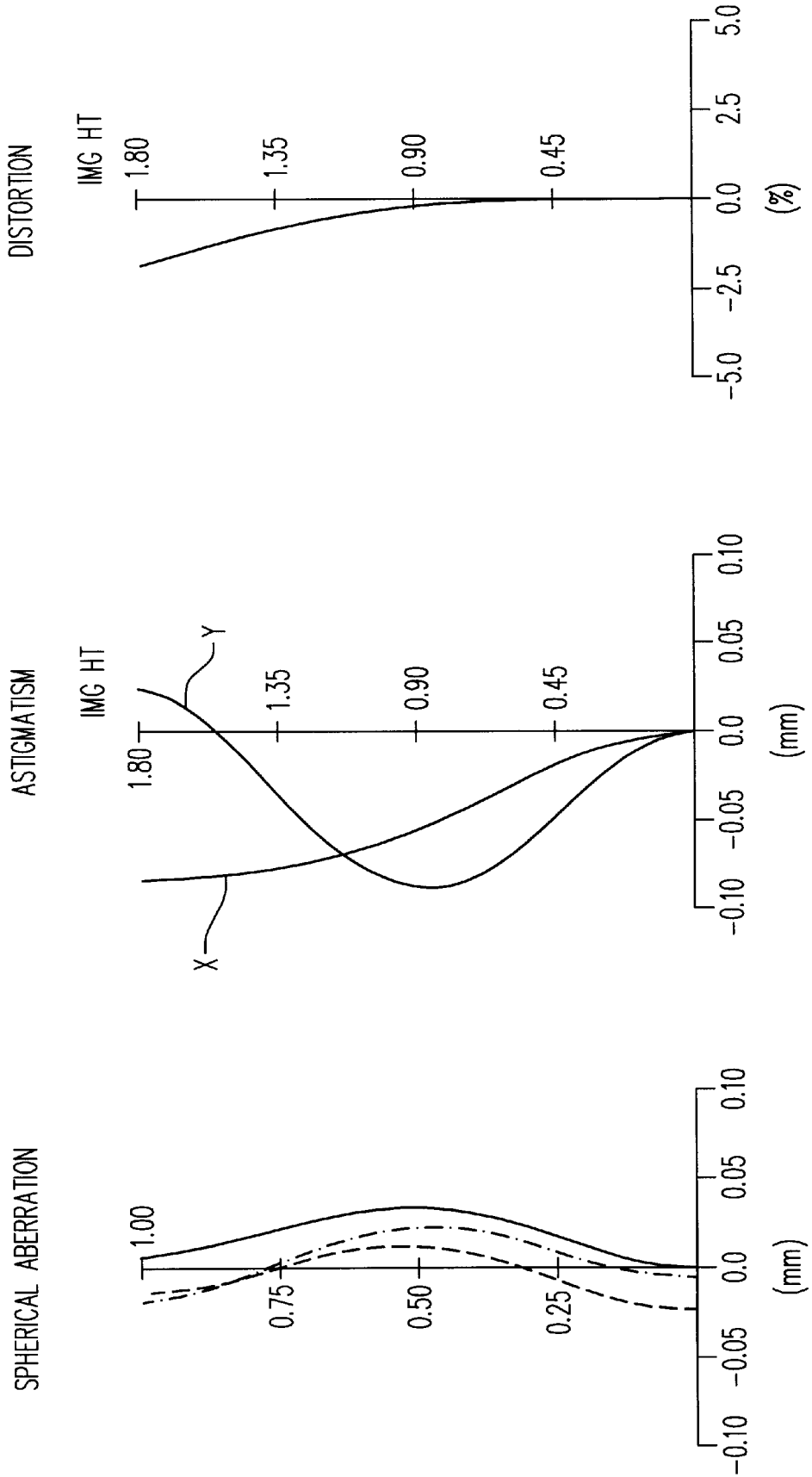
FIGS. 5a–5c are aberration diagrams at the intermediate focal length of the first embodiment.

FIGS. 4–6 are aberration diagrams corresponding to the aforesaid numerical example 1, and respectively show in sequence aberration at the wide angle end, intermediate focal length, and telephoto end. FIGS. 7–9 are aberration diagrams corresponding to the aforesaid numerical example 2, and respectively show in sequence aberration at the wide angle end, intermediate focal length, and telephoto end. FIGS. 10–12 are aberration diagrams corresponding to the aforesaid numerical example 3, and respectively show in sequence aberration at the wide angle end, intermediate focal length, and telephoto end. In the aberration diagrams, (a) shows spherical aberration, (b) shows astigmatism, and (c) shows distortion.

In the spherical aberration diagrams, the solid line represents spherical aberration at the d-line, the broken line represents spherical aberration at the C-line, and the dashed line represents spherical aberration at the e-line. In the astigmatism diagrams, X and Y represent astigmatism at the d-line on the saggital plane and meridional plane, respectively. The numerical values corresponding to the previously described conditional equations (1)–(4) in each of the numerical examples 1–3 are shown in Table 4.

TABLE 4

|  | Embodiment 1 First Lens Unit | Embodiment 1 Second Lens Unit | Embodiment 2 | Embodiment 3 |
|---|---|---|---|---|
| $\|\phi_d/\phi\|$ | 0.054 | 0.070 | 0.054 | 0.093 |

|  | Embodiment 1 | Embodiment 2 | Embodiment 3 |
|---|---|---|---|
| $\|\phi_1/\phi_2\|$ | 0.647 | 0.700 | 0.730 |

Although the present invention has been fully described by way of examples with reference to the accompanying drawings, it is to be noted that various changes and modifications will be apparent to those skilled in the art. Therefore, unless such changes and modifications otherwise depart from the scope of the present invention, they should be construed as being included therein.

What is claimed is:

1. A zoom lens system comprising from an object side;
   a first lens unit located at the end of the lens system on the object side and having a negative optical power, and
   a second lens unit located at an image side of the first lens unit with a variable air space therebetween,
   wherein the first and second lens units are movable along an optical axis for zooming operation, and a lens element in at least one of said first and second lens units has a diffractive type optical surface, and wherein said diffractive optical surface satisfies the following condition:

$0.02 < |\phi d/\phi| < 0.2$ where
   $\phi d = -2m\, R2$
   R2 is a second degree phase coefficient.
   m is the diffraction degree,
   $\phi = \phi r + \phi d$ represents the optical power of the lens,
   $\phi r$ is the optical power of the lens element, and
   $\phi d$ is the optical power of the diffractive optical element.

2. The zoom lens system of claim 1, wherein said diffractive optical surface is represented by the phase function:

$\Phi(H) = 2\Sigma(\Sigma R_i H^i)\lambda_o,$ where $\Phi$ represents the phase function,
   H represents height in a direction perpendicular to an optical axis,
   $R_i$ represents a first degree phase coefficient, and
   $\lambda_o$ represents a design wavelength.

3. The zoom lens system of claim 1 wherein at least one surface of said lens element is an aspherical surface.

4. The zoom lens system of claim 1 wherein said diffractive optical surface has a sawtooth shape.

5. The zoom lens system of claim 4 wherein said diffractive optical surface is formed by a resin layer on a glass lens element.

6. The zoom lens system of claim 4 wherein said lens element is made of glass, and said diffractive optical surface is integrally formed in said glass.

7. The zoom lens system of claim 4 wherein said lens element is made of plastic, and said diffractive optical surface is integrally formed in said plastic.

8. The zoom lens system of claim 1 wherein said first and second lens units satisfy the following condition:

$$0.5 < |\phi 1|/\phi 2 < 0.9,$$

where $\phi 1$ is the optical power of the first lens unit, and $\phi 2$ is the optical power of the second lens unit.

9. A zoom lens system comprising, from an object side;

a first lens unit located at the end of the lens system on the object side and having a negative optical power, and a second lens unit located at an image side of the first lens unit with a variable air space therebetween, wherein the first and second lens units are movable along an optical axis for zooming operation, and a lens element in at least one of said first and second lens units has a diffractive type optical surface wherein the diffractive optical surface and the opposite surface of said lens element are aspherical surfaces.

10. The zoom lens system of claim 9 wherein said aspherical surface has the following shape:

$$x(H) = C \cdot H^2 / \{1 + (1 - \epsilon C^2 \cdot H^2)^{1/2}\} + \Sigma AiH^i$$

where H represents the height in a direction perpendicular to the optical axis, x(H) represents the amount of displacement in the optical axis direction at the position of height H, C represents the paraxial curvature, $\epsilon$ represents the second degree curvature parameter, and Ai represents the aspherical surface coefficient of degree i.

11. The zoom lens system of claim 9 wherein said diffractive optical surface has a sawtooth shape.

12. The zoom lens system of claim 11 wherein said diffractive optical surface is formed by a resin layer on a glass lens element.

13. The zoom lens system of claim 11 wherein said lens element is made of glass, and said diffractive optical surface is integrally formed in said glass.

14. The zoom lens system of claim 11 wherein said lens element is made of plastic, and said diffractive optical surface is integrally formed in said plastic.

15. The zoom lens system of claim 9 wherein said first and second lens units satisfy the following condition:

$$0.5 < |\phi 1|/\phi 2 < 0.9,$$

where $\phi 1$ is the optical power of the first lens unit, and $\phi 2$ is the optical power of the second lens unit.

16. A zoom lens system comprising, from the object side:

a first lens unit having a negative optical power and located at the end of the lens system on the object side; and a second lens unit located at an image side of the first lens unit with a variable air space therebetween;

wherein the first and second lens units are movable along an optical axis for zooming operation; and a lens element in at least one of said first and second lens units has a diffractive-refractive hybrid type optical surface, and wherein said diffractive-refractive hybrid type optical surface satisfies the following condition:

$$0.02 < |\phi d/\phi| < 0.2$$

where $\phi d = -2m\ R2$

R2 is a second degree phase coefficient, m is the diffraction degree, $\phi = \phi r + \phi d$ represents the optical power of the lens, $\phi r$ is the optical power of the lens element, and $\phi d$ is the optical power of the diffractive optical element.

17. The zoom lens system of claim 16, wherein said diffractive-refractive hybrid type optical surface is represented by the phase function:

$$\Phi(H) = 2\pi(\Sigma R_i H^i)\lambda_o,$$

where $\Phi$ represents the phase function,

H represents height in a direction perpendicular to an optical axis, $R_i$ represents a first degree phase coefficient, and $\lambda_o$ represents a design wavelength.

18. The zoom lens system of claim 16 wherein at least one surface of said lens element is an aspherical surface.

19. The zoom lens system of claim 16 wherein said diffractive-refractive hybrid type optical surface has a sawtooth shape.

20. The zoom lens system of claim 19 wherein said diffractive-refractive hybrid type optical surface is formed by a resin layer on a glass lens element.

21. The zoom lens system of claim 19 wherein said lens element is made of glass, and said diffractive-refractive hybrid type optical surface is integrally formed in said glass.

22. The zoom lens system of claim 19 wherein said lens element is made of plastic, and said diffractive-refractive hybrid type optical surface is integrally formed in said plastic.

23. The zoom lens system of claim 16 wherein said first and second lens units satisfy the following condition:

$$0.5 < |\phi 1|/\phi 2 < 0.9,$$

where $\phi 1$ is the optical power of the first lens unit, and $\phi 2$ is the optical power of the second lens unit.

24. A zoom lens system comprising, from the object side:

a first lens unit having a negative optical power and located at the end of the lens system on the object side; and a second lens unit located at an image side of the first lens unit with a variable air space therebetween;

wherein the first and second lens units are movable along an optical axis for zooming operation, and a lens element in at least one of said first and second lens units has a diffractive-refractive hybrid type optical surface, wherein the diffractive-refractive hybrid type optical surface and the opposite surface of said lens element are aspherical surfaces.

25. The zoom lens system of claim 24 wherein said aspherical surface has the following shape:

$$x(H) = C \cdot H^2 / \{1 + (1 - \epsilon C^2 \cdot H^2)^{1/2}\} + \Sigma AiH^i$$

where H represents the height in a direction perpendicular to the optical axis, x(H) represents the amount of displacement in the optical axis direction at the position of height H, C represents the paraxial curvature, $\epsilon$ represents the second degree curvature parameter, and Ai represents the aspherical surface coefficient of degree i.

26. The zoom lens system of claim 24 wherein said first and second lens units satisfy the following condition:

$$0.5 < |\phi 1|/\phi 2 < 0.9,$$

where
- φ1 is the optical power of the first lens unit, and
- φ2 is the optical power of the second lens unit.

27. A zoom lens system for forming an image of an object onto a solid state image device, comprising, from the object side:
- a first lens unit having a negative optical power and located at the end of the lens system on the object side;
- a second lens unit located at an image side of the first lens unit with a first variable air space therebetween; and
- a filter located at an image side of the second lens unit with a second variable air space therebetween;
- wherein the first and second lens units are movable along an optical axis for zooming operation; and
- wherein a lens element in at least one of said first and second lens units has a diffractive type optical surface.

28. The zoom lens system of claim 27, wherein said diffractive optical surface is represented by the phase function:

$$\Phi(H) = 2\pi (\Sigma R_i H^i) \lambda_o,$$

where
- $\Phi$ represents the phase function,
- H represents height in a direction perpendicular to an optical axis,
- $R_i$ represents a first degree phase coefficient, and
- $\lambda_o$ represents a design wavelength.

29. The zoom lens system of claim 24 wherein said diffractive-refractive hybrid type optical surface has a sawtooth shape.

30. The zoom lens system of claim 29 wherein said diffractive-refractive hybrid type optical surface is formed by a resin layer on a glass lens element.

31. The zoom lens system of claim 29 wherein said lens element is made of glass, and said diffractive-refractive hybrid type optical surface is integrally formed in said glass.

32. The zoom lens system of claim 29 wherein said lens element is made of plastic, and said diffractive-refractive hybrid type optical surface is integrally formed in said plastic.

33. The zoom lens system of claim 27 wherein said diffractive optical surface satisfies the following condition:

$$0.02\ 21\ |\phi d/\phi| < 0.2$$

where
- $\phi d = -2m\ R2$
- R2 is a second degree phase coefficient,
- m is the diffraction degree,
- $\phi = \phi r + \phi d$ represents the optical power of the lens,
- φr is the optical power of the lens element, and
- φd is the optical power of the diffractive optical element.

34. The zoom lens system of claim 27 wherein at least one surface of said lens element is an aspherical surface.

35. The zoom lens system of claim 34, wherein the diffractive optical surface and the opposite surface of said lens element are aspherical surfaces.

36. The zoom lens system of claim 34 wherein said aspherical surface has the following shape:

$$x(H) = C \cdot H^2 / \{1 + (1 - \epsilon C^2 \cdot H^2)^{1/2}\} + \Sigma A i H^i$$

where H represents the height in a direction perpendicular to the optical axis, x(H) represents the amount of displacement in the optical axis direction at the position of height H, C represents the paraxial curvature, E represents the second degree curvature parameter, and Ai represents the aspherical surface coefficient of degree i.

37. The zoom lens system of claim 27 wherein said diffractive optical surface has a sawtooth shape.

38. The zoom lens system of claim 37 wherein said diffractive optical surface is formed by a resin layer on a glass lens element.

39. The zoom lens system of claim 37 wherein said lens element is made of glass, and said diffractive optical surface is integrally formed in said glass.

40. The zoom lens system of claim 37 wherein said lens element is made of plastic, and said diffractive optical surface is integrally formed in said plastic.

41. The zoom lens system of claim 27 wherein said first and second lens units satisfy the following condition:

$$0.5 < |\phi 1|/\phi 2 < 0.9,$$

where
- φ1 is the optical power of the first lens unit, and
- φ2 is the optical power of the second lens unit.

42. A zoom lens system comprising first and second lens units, wherein said first lens unit is located closer to an object side of the lens system and has a negative optical power, and said second lens unit is located farther from the object side of the lens system and has a positive optical power, and wherein a lens element in at least one of said first and second lens units has a diffractive type optical surface which is represented by the phase function:

$$\Phi(H) = 2\pi (\Sigma R_i H^i) \lambda_o,$$

where
- $\Phi$ represents the phase function,
- H represents height in a direction perpendicular to an optical axis,
- $R_i$ represents a first degree phase coefficient, and
- $\lambda_o$ represents a design wavelength.

43. A zoom lens system comprising first and second lens units, wherein said first lens unit is located closer to an object side of the lens system and has a negative optical power, and said second lens unit is located farther from the object side of the lens system and has a positive optical power, and wherein a lens element in at least one of said first and second lens units has a diffractive type optical surface which satisfies the following condition:

$$0.02\ 21\ |\phi d/\phi| < 0.2$$

where
- $\phi d = -2m\ R2$
- R2 is a second degree phase coefficient,
- m is the diffraction degree,
- $\phi = \phi r + \phi d$ represents the optical power of the lens,
- φr is the optical power of the lens element, and
- φd is the optical power of the diffractive optical element.

44. A zoom lens system comprising first and second lens units, wherein said first lens unit is located closer to an object side of the lens system and has a negative optical power, and said second lens unit is located farther from the object side of the lens system and has a positive optical power, and wherein a lens element in at least one of said first and second lens units has a diffractive type optical surface, and wherein the diffractive optical surface and the opposite surface of said lens element are aspherical surfaces.

45. A zoom lens system comprising first and second lens units, wherein said first lens unit is located closer to an object side of the lens system and has a negative optical power, and said second lens unit is located farther from the object side of the lens system and has a positive optical power, .and wherein a lens element in at least one of said first and second lens units has a diffractive type optical surface wherein said diffractive optical surface has a saw-tooth shape and is formed by a resin layer on a glass lens element.

46. A zoom lens system comprising first and second lens units, wherein said first lens unit is located closer to an object side of the lens system and has a negative optical power, and said second lens unit is located farther from the object side of the lens system and has a positive optical power, and said first and second lens units satisfy the following condition:

$$0.5<|\phi 1|/\phi 2<0.9,$$

where $\phi 1$ is the optical power of the first lens unit, and $\phi 2$ is the optical power of the second lens unit, and wherein a lens element in at least one of said first and second lens units has a diffractive type optical surface.

47. A zoom lens system comprising, from the object side,
- a first lens unit having a negative optical power and including at least one diffractive optical surface; and
- a second lens unit having a positive optical power and including at least one diffractive optical surface,
- wherein the distance between the first and second lens units varies during a zooming operation.

48. An optical system for forming an image of an object on a solid-state imaging device comprising, from the object side,
- a first lens unit having a negative optical power and including at least one diffractive optical surface;
- a second lens unit having a positive optical power and including at least one diffractive optical surface; and
- a filter provided between the second lens unit and the image formed by said optical system,
- wherein the distance between the first and second lens units varies during a zooming operation.

* * * * *